3,826,704
METHOD OF BONDING POLYOLEFINE TO A SUBSTANCE
Shogo Ohya, 48 Jodoji Kamiminamidacho, Sakyo-ku, Kyoto, Japan; Katsuyuki Hara, 5-4 Ohatacho, Takatsuki, Osaka, Japan; Momoyoshi Takagi, B30-404, 167 Koaza Kanafuri, Aaza Yahataso, Yahatacho, Tsuzuki-gun, Kyoto, Japan; and Masao Kurokawa, 2-21-6-310 Himonya, Meguro-ku, Tokyo, Japan
No Drawing. Continuation-in-part of abandoned application Ser. No. 874,073, Oct. 9, 1969. This application Sept. 24, 1971, Ser. No. 183,685
Claims priority, application Japan, July 8, 1969, 44/53,665
Int. Cl. B32b 31/24; C09j 5/02
U.S. Cl. 156—306                                       1 Claim

ABSTRACT OF THE DISCLOSURE

A method of bonding polyolefine to a substance such as a steel plate. The polyolefine and the plate are heated to a temperature equal to the melting point of polyolefine plus at least 100° C., and the melted polyolefine is brought into contact with the plate and kept at the temperature for at least five minutes for producing bonding strength at the boundary surface between the polyolefine and the substance. The boundary surface is cooled by keeping it for at least ten minutes at a further temperature between the temperature $T_m$ where the rate of crystallization is maximized and a temperature of $T_m+80°$ C., or by cooling it from this temperature at a rate of 8° C. per minute. The internal stress caused in the polyolefine is thereby prevented from being concentrated at the boundary surface.

---

This application is a continuation in part of application Ser. No. 874,073 filed Oct. 9, 1969, and now abandoned.

This invention relates to a method of bonding polyolefine to a metal or any other substance to be covered therewith in which method the bonding strength in terms of tensile shear strength is not less than 100 kg./cm.$^2$ when polyethylene or crystalline polypropylene is used, and not less than 50 kg./cm.$^2$ when polybutyne is used.

The term "bonding" is used many ways, indefinitely, in a broad, or in a limited sense. The bonding achieved in accordance with this invention should be understood in the strict sense, i.e. bonding as strong as indicated above.

As background for a full understanding of the object, effect and claims of this invention, a history of research and development in the field of bonding properties of polyolefine will be briefly described.

It is widely known that polyolefine, particularly polyethylene, has extremely poor adhesion properties. An explanation for such low bonding strength is the theory of WBL (weak boundary layer), presented in 1961, to the effect that a weak boundary layer formed in the polyolefine near a boundary surface to be bonded is destroyed (J. J. Bikerman, J. Appl. Chem. 11, No. 3.81 (1961)).

Thereafter, Schonhorn and other collaborators with Bell Telephone Laboratories determined that breaking occurs in the weak boundary layer when polyethylene, which was melted and bonded to the surface of aluminum having a monomolecular film of stearic acid having C14 adsorbed therein, was peeled off the aluminum (H. Schonhorn, *Polymer Letters*, 2, 465 (1964)).

Schonhorn introduced a crosslinking method in which impurities which cause the formation of such a weak boundary layer are prevented from gathering together at the surface of polyethylene by treating it with inert gas activated for crosslinking (H. Schorhorn, *J. Polymer Sci.*, 4B, 203 (1966); H. Schonhorn, *J. Polymer Sci.* 11, 1461 (1967)). Furthermore, a transcrystal process was developed in which crystallization could be controlled during the process of preparation of polyethylene film (H. Schonhorn, *J. Polymer Sci.*, 6, A-2, 231 (1967)).

Polyolefine, particularly crystalline polyethylene, could thus be bonded very firmly for the first time by the foregoing two methods—crosslinkinge and transcrystal methods (tensile shear strength 2000 to 3000 p.s.i.).

In conventional production of polyolefine laminates, such processes as heating polyolefine and a substance together or separately up to temperature above the melting point of polyolefine and then cooling quickly is required for bonding. In such a case it is also suggested that the contact time before cooling be relatively long (for instance, five minutes or longer).

In this manner, good bonding strength can be obtained to a certain degree, but it is not as strong as achieved by Schonhorn or by the method of this invention.

As has been described above, polyolefine cannot be bonded firmly just by melting it and applying it to a substance and then cooling under ordinary conditions because of the low bonding capability of polyolefine.

For this reason, when strong bonding is required between polyolefine and a substance to be covered therewith, the surface of the polyethylene must be treated previously by a corona discharge, a flame, a liquid mixture of bichromate and sulfuric acid, or by electron beam radiation so as to improve the bonding strength, and in addition epoxy resin or gum adhesive must be applied thereto.

However, such a bonding method has the disadvantages that the bonding technique is complicated by such surface treatments, for example, of polyethylene and the like, required before bonding, that the properties of, for example, polyethylene, are deteriorated as a result, and that coating such as adhesive evenly on the surface of any substance is difficult, depending on its shape or size.

In accordance with this invention, a method is provided for producing a bonding strength between polyolefine and a substance to be covered therewith as high or higher than any obtained by prior art method without the use of any surface treatment of the polyolefine for crosslinking of the use of adhesive, such an epoxy resin and the like.

We consider the following to be the reasons for the low bonding ability of polyolefine: when polyolefine is cooled quickly after having been melted by heating and is bonded to a substance to be covered therewith, or when polyolefine is left to cool naturally after having been melted by heating and bonded to a substance having a small thermal capacity, internal stress caused by cohesion forces, which may be produced within the bonded portion of the polyolefine during the cooling is concentrated at the boundary surface of the bond. This makes the bonding ability of polyolefine poor. This is thus related not to the processes of heating the polyolefine above the melting point, bringing it into contact with a substance to be covered therewith and keeping them in contact for a certain fixed time, but rather is related to the cooling process.

Bonding strength in accordance with this invention is at least 100 kg./cm.$^2$ or higher in terms of tensile shear strength for such materials as high-density polyethylene, low-density polyethylene, and crystalline polypropylene, and 50 kg./cm.$^2$ or higher with polybutyne. Such values show that failure is due not to peeling, but to breaking due to aggregation produced in the polyolefine.

It will be seen from the results of experiments described in the following examples under what conditions strong bonding strength according to this invention can be obtained. The present invention comprises a method for bonding polyolefine to a substance to be coated by heating both up to at least the melting point of polyolefine plus 100° C., placing the polyolefine in contact with the substance in the melted state, and keeping the above temperature constant for at least five minutes or longer, which is a period of time necessary for creating bonding strength in the boundary surface. In the method of this invention, internal stress is prevented from being concentrated in the boundary surface during bonding, said stress being produced in the polyolefine in the process of cooling the boundary surface by keeping the polyolefine for at least ten minutes in a temperature range from a temperature where the rate of crystallization is maximized to a temperature which is said maximum crystallization temperature plus 80° C., or by cooling the polyolefine gradually in the same temperature range at a rate of no more than 8° C./min.

The temperature, on the Celsius Scale, at which the rate of crystallization is maximized, is generally given by:

$T_m = [\text{melting point } (°C.+273) \times 9/10] - 273$ and therefore the above temperature range, if given on the Celsius scale is from $T_m$ to $(T_m+80°$ C.).

In accordance with this invention, such internal stress as described above can be prevented from being concentrated at the boundary surface by cooling the polyethylene gradually, whereby strong bonding is obtained.

The bonding strength achieved by the method of this invention is excellent, as will be understood from the following test results, which show the bonding strength to be much higher than standards for adhesive in Japan (40 kg./cm.$^2$ lowest for Class 1 and 80 kg./cm.$^2$ highest for Class 5, in accordance with JIS—Japanese Industrial Standard—shearing test). This means that polyolefine, particularly polyethylene, has heretofore been considered to have no adhesive property in the strict sense because of its chemical stability, and consequently use of such polyethylene as an adhesive has never been considered and expected. However, this invention makes it possible to use polyolefine as an adhesive.

As described above, in accordance with this invention polyolefine can be used not only for bonding to substances to be covered therewith, but also can be used as excellent adhesive for strong adhesion between two substances and two- or multi-layer laminated boards or tubes or pipes made of various materials and polyethylene, making good use of their properties, can be manufactured.

Furthermore, neither prior chemical nor physical treatment is required for the polyolefine because no specific adhesive is used for bonding it to substances and accordingly chemical denaturation (copolymerization with any other substance) or physical denaturation (mixing with any other substance) of the polyolefine is prevented. Thus, strong bonding is achieved by a simple operation.

Still furthermore, even when polyolefine is remelted by again heating the boundary surface after its bonding to a substance in accordance with this invention, the boundary surface can be firmly bonded again by gradual cooling under the above conditions. This advantage may be utilized very effectively for secondary working, particularly for bending work with heat and the like.

In prior-art methods for bonding by use of adhesive, it is difficult to coat adhesive evenly on any large surface of a substance, and the surface tends to be made neither flat nor even because of the thickness which varies. Such a disadvantage is eliminated by the method of bonding in accordance with this invention in which a polyolefine film is applied.

High bonding strength between polyolefine and a substance can be utilized advantageously and effectively for secondary working such as bending, punching, and cutting work.

The invention will be explained in greater detail in the following examples.

Theoretically and technically it will be apparent that substances to be coated or adhered to each other by the method used in this invention must be such as to substantially withstand heating over the melting point of polyolefine, and that heating, even though it must be where over the melting point, cannot be at any temperature the polyolefine itself may be denatured.

Example 1

Substance: Commercial steel plate 3 mm. thick, surface-treated (surface polished), and degreased.
Polymer used: high-density polyethylene having a density of 0.96 g./cm.$^3$ and a melting index of 0.9.
Method of bonding:
(a) Film made by a melting-extruding method was bonded to the steel plate by putting the film thereon, melting the film by heating at a specific melting-bonding temperature as shown in the table below, holding the melting bonding temperature for a specific time as shown in the same table, annealing directly thereafter in an air thermostatic oven, the temperature of which was set at 142° C. for 60 minutes, and allowing it to stand at room temperature for cooling it. The annealing temperature of 142° is within the range $T_m$ to $T_m+50°$ C. for high density polyolefine for which $T_m=135°$ C.
(b) Polyethylene melted and extruded in the form of film by a melting-extruding method was bonded to the surface of the steel plate previously heated up to a specific temperature by putting the film thereon, holding at the melting-bonding temperature, and cooling it as in method (a).

Bonding Strength Test: Peeling off and shearing tests were conducted by using a Shimazu autograph testing machine (with pulling speed of 30 mm./min.). The shearing test was made by measuring the bonding strength between two steel plates bonded to each other with polyethylene placed therebetween by each of the above methods (a) and (b). The thickness of the polyethylene was 0.34 mm. for the shearing test and 1 mm. for the peeling off test.

| Method of bonding | Melting-bonding temperature, °C. | Melting-bonding time (minutes) | Bonding strength against peeling off | Bonding strength against shearing, kg./cm.$^3$ |
|---|---|---|---|---|
| (a) | 135 | 6 | Almost none | Almost none. |
| (a) | 180 | 60 | Polyethylene cut off | 120. |
| (a) | 250 | 30 | do | 180. |
| (a) | 300 | 6 | do | 320. |
| (b) | 135 | 6 | Almost none | Almost none. |
| (b) | 180 | 60 | Polyethylene cut off | 120. |
| (b) | 250 | 30 | do | 180. |
| (b) | 300 | 6 | do | 320. |

The above test results show that the effects produced by the methods (a) and (b) are the same. Therefore, in the following examples, test results are given for both methods (a) and (b).

Example 2

Substance: The same as used in Example 1.
Polymer Used: Low-density polyethylene having a density of 0.923 g./cm.$^2$ and a melting index of 4.
Method of Bonding: The same as in Example 1.
Bonding Strength Test: The same as in Example 1.

| Method of bonding | Melting-bonding temperature, °C. | Melting-bonding time (minutes) | Bonding strength against peeling off | Bonding strength against shearing, kg./cm.$^3$ |
|---|---|---|---|---|
| (a) | 100 | 6 | Almost none | Almost none. |
| (a) | 200 | 5 | Polyethylene cut off | 100. |
| (b) | 100 | 6 | Almost none | Almost none. |
| (b) | 200 | 5 | Polyethylene cut off | 100. |

There was little change at melting-bonding temperatures varying from 200° C. to 300° C., and moreover, the low-density polyethylene itself was damaged by cohesion due to the bonding strength against shearing being up to 10 kg./cm.²

Example 3

Substance and Method of Bonding: The same as used in Example 1.
Polymer Used: Polybutene-1 having a density of 0.92, melting point of 136° C., and mean molecular weight of $1.65 \times 10^6$.
Bonding Strength Test: The same as in Example 1.

| Method of bonding | Melting-bonding temperature, °C. | Melting-bonding time (minutes) | Bonding strength against peeling off | Bonding strength against shearing, kg./cm.² |
|---|---|---|---|---|
| (a) | 140 | 12 | Almost none | Almost none. |
| (a) | 240 | 6 | Polyethylene-1 cut off | 50. |
| (b) | 140 | 12 | Almost none | Almost none. |
| (b) | 240 | 6 | Polyethylene-1 cut off | 50. |

Example 4

Substance and Method of Bonding: The same as used in Example 1.
Polymer Used: Polypropylene having a density of 0.90 and a melting index of 4.
Bonding Strength Test: The same as in Example 1.

| Method of bonding | Melting-bonding temperature, °C. | Melting-bonding time (minutes) | Bonding strength against peeling off | Bonding strength against shearing, kg./cm.² |
|---|---|---|---|---|
| (a) | 180 | 6 | Almost none | Almost none. |
| (a) | 280 | 5 | Polyethylene cut off | 100. |
| (b) | 180 | 6 | Almost none | Almost none. |
| (b) | 280 | 5 | Polyethylene cut off | 100. |

Example 5

Substance: Plate glass 5 mm. thick with the surface degreased.
Polymer used: Low-density polyethylene the same as in Example 1.
Method of Bonding: The same as in Example 1.
Bonding Strength Test: The same as in Example 1.

| Method of bonding | Melting-bonding temperature, °C. | Melting-bonding time (minutes) | Bonding strength against peeling off | Bonding strength against shearing, kg./cm.² |
|---|---|---|---|---|
| (a) | 100 | 12 | Almost none | Almost none. |
| (a) | 200 | 10 | Polyethylene cut off | 100. |
| (b) | 100 | 12 | Almost none | Almost none. |
| (b) | 200 | 10 | Polyethylene cut off | 100. |

Example 6

Substance: Commercial aluminum plate 3 mm. thick with the surface degreased.
Polymer Used: The same as used in Example 2.
Method of Bonding: The same as in Example 2.
Bonding Strength Test: The same as in Example 1.

| Method of bonding | Melting-bonding temperature, °C. | Melting-bonding time (minutes) | Bonding strength against peeling off | Bonding strength against shearing, kg./cm.² |
|---|---|---|---|---|
| (a) | 100 | 12 | Almost none | Almost none. |
| (a) | 200 | 10 | Polyethylene cut off | 100. |
| (b) | 100 | 12 | Almost none | Almost none. |
| (b) | 200 | 10 | Polyethylene cut off | 100. |

Example 7

Substance: Copper plate 3 mm. thick with the surface degreased.
Polymer Used: The same as in Example 1.
Method of Bonding: The same as in Example 1.
Bonding Strength Test: The same as in Example 1.

| Method of bonding | Melting-bonding temperature, °C. | Melting-bonding time (minutes) | Bonding strength against peeling off | Bonding strength against shearing, kg./cm.² |
|---|---|---|---|---|
| (a) | 100 | 12 | Almost none | Almost none. |
| (a) | 250 | 10 | Polyethylene cut off | 135. |
| (b) | 100 | 12 | Almost none | Almost none. |
| (b) | 250 | 10 | Polyethylene cut off | 135. |

Example 8

Substance: The same as used in Example 1.
Polymer Used: The same as in Example 1.
Method of Bonding: Film made by a melting-extruding method was bonded onto the steel sheet by putting the film thereon, melting the film by heating at 300° C. and holding the temperature at 300° C. for five minutes. The coated sheet was annealed immediately thereafter in an air thermostatic oven at a temperature of 142° C. for the annealing time, as shown in the table below, ten minutes for one material and thirty minutes for the other.
Bonding Strength Test: The same as the bonding strength against shearing test, as in Example 1.

| | Melting-bonding time, minutes | Annealing time, minutes | Bonding strength against shearing, kg./cm.² |
|---|---|---|---|
| Melting-bonding temperature, °C.: | | | |
| 300 | 5 | 10 | 150 |
| 300 | 5 | 30 | 200 |

Example 9

Substance: The same used in Example 1.
Polymer Used: The same as in Example 1.
Method of Bonding: Film made by a melting-extruding method was bonded onto a steel sheet by putting the film thereon, melting the film by heating at 300° C. and holding the temperature at 300° C. for five minutes. The coated sheet was annealed, putting it directly into an oven at 170° C. and lowering the temperature to 90° C. for ten minutes at a rate of 8° C. per minute.
Bonding Strength Test: The same as the bonding strength against shearing test in Example 1.

The results obtained in this case is 150 kg./cm.², which is the same as in Example 8.

What is claimed is:
1. A method of bonding polyolefine to a substance to be covered therewith comprising heating the polyolefine and the substance to a temperature equal to the melting point of polyolefine plus at least 100° C., bringing the substance and polyolefine in the melted state into contact and keeping them at said temperature for at least five minutes for producing bonding strength at the boundary surface between the polyolefine and the substance, cooling said boundary surface by keeping it for at least ten minutes at a further temperature between a temperature $T_m$ and a temperature $T_m+80°$ C., $T_m$ being the temperature at which the rate of crystallization of the polyolefin is maximized and is given by the formula [(melting point (° C.)+273)×9/10]−273, and thereafter cooling the substance and the polyolefine by allowing it to stand in air at room temperature, whereby the internal stress caused in the polyolefine is prevented from being concentrated at the boundary surface.

References Cited
UNITED STATES PATENTS

| | | | |
|---|---|---|---|
| 2,714,571 | 8/1955 | Irion et al. | 156—244 |
| 3,402,086 | 9/1968 | Smith et al. | 156—244 |
| 3,514,308 | 5/1970 | Scott et al. | 117—21 |
| 3,660,200 | 5/1972 | Anderson et al. | 156—306 |

CHARLES E. VAN HORN, Primary Examiner

R. A. DAWSON, Assistant Examiner

U.S. Cl. X.R.

117—119.2; 156—244, 322